United States Patent
Mu et al.

(10) Patent No.: US 12,458,044 B2
(45) Date of Patent: Nov. 4, 2025

(54) RECOMBINANT ANTIBACTERIAL PEPTIDE TRSUB, PREPARATION METHOD AND APPLICATION FOR SAME

(71) Applicant: SOHAO FD-TECH CO., LTD., QingDao (CN)

(72) Inventors: Haijin Mu, QingDao (CN); Dongxing Yu, QingDao (CN); Yongjian Liu, QingDao (CN); Yongwen Liu, QingDao (CN); Liping Gao, QingDao (CN); Qingping Liang, QingDao (CN); Zhemin Liu, QingDao (CN); Lin Zhu, QingDao (CN)

(73) Assignee: SOHAO FD-TECH CO., LTD., QingDao (CN)

(*) Notice: Subject to any disclaimer, the term of this patent is extended or adjusted under 35 U.S.C. 154(b) by 561 days.

(21) Appl. No.: 17/889,445

(22) Filed: Aug. 17, 2022

(65) Prior Publication Data
US 2023/0329283 A1    Oct. 19, 2023

(30) Foreign Application Priority Data
Nov. 26, 2021  (CN) .......... 202111417402.8

(51) Int. Cl.
C07K 14/00       (2006.01)
A23K 20/147      (2016.01)
A61P 31/04       (2006.01)

(52) U.S. Cl.
CPC ................. *A23K 20/147* (2016.05)

(58) Field of Classification Search
CPC .......... C07K 14/00; C07K 7/08; A61P 31/04; C12N 15/81
See application file for complete search history.

(56) References Cited

U.S. PATENT DOCUMENTS

| | | |
|---|---|---|
| 2007/0082056 A1 | 4/2007 | Sawhill |
| 2010/0222268 A1 | 9/2010 | Hoffmann et al. |
| 2016/0031940 A1 | 2/2016 | Garcia et al. |

*Primary Examiner* — Maryam Monshipouri
(74) *Attorney, Agent, or Firm* — Hemisphere Law, PLLC; Zhigang Ma

(57) ABSTRACT

A recombinant antibacterial peptide TrSub, preparation method and application for the recombinant antibacterial peptide TrSub is disclosed, and belongs to the field of genetic engineering and biotechnology. The amino acid sequence of the recombinant antimicrobial peptide TrSub is shown in SEQ ID No. 1. The nucleotide sequence encoding the amino acid shown in SEQ ID NO.1 is shown in SEQ ID NO.2. The disclosure also provides a method for preparing the recombinant antimicrobial peptide TrSub, wherein the recombinant antimicrobial peptide TrSub has an inhibitory effect on *Escherichia coli*, *Salmonella*, *Staphylococcus aureus* and *Clostridium perfringens*. The disclosure has good thermal stability, acid resistance, pepsin resistance and low hemolytic activity, and is beneficial to the application of the disclosure in the preparation of fee and feed additive.

5 Claims, 4 Drawing Sheets
Specification includes a Sequence Listing.

RECOMBINANT ANTIBACTERIAL PEPTIDE TRSUB, PREPARATION METHOD AND APPLICATION FOR SAME

REFERENCE TO SEQUENCE LISTING

The substitute sequence listing is submitted as a XML file filed via EFS-Web, with a file name of "Substitute_Sequence_Listing_SJDL-USP1222987-97-1004.XML", a creation date of Mar. 4, 2023, and a size of 4578 bytes. The substitute sequence Listing filed via EFS-Web is a part of the specification and is incorporated in its entirety by reference herein.

This patent application claims the benefit and priority of Chinese Patent Application No. 202111417402.8 filed on Dec. 26, 2021, the disclosure of which is incorporated by reference herein in its entirety as part of the present application.

TECHNICAL FIELD

The present disclosure relates to the field of genetic engineering and biotechnology, and particularly relates to a method and application for recombinant antibacterial peptide TrSub in *Trichoderma reesei*.

BACKGROUND ART

In animal breeding, bacterial diseases, such as bacterial diarrhea, seriously endanger animal health and cause great losses to breeding. At present, antibiotics are mainly used to treat and prevent it, but the overuse and abuse of antibiotics constantly lead to the emergence of drug-resistant strains and drug resistance, thus threatening human health. The introduction of a ban on the use of antibiotics in China in 2020 has made the emergence and exploration of alternatives to antibiotics urgent. Antibacterial peptides (AMPs) are a kind of small molecular peptides with wide sources, small molecular weight and spectral antibacterial activity. Compared with traditional antibiotics, antimicrobial peptides are natural active substances, pollution-free, and not easy to produce drug resistance, so they are potential substitutes for antibiotics. However, the preparation methods of biological extraction and chemical synthesis have high cost and low efficiency, and it is difficult to achieve mass production, which can't meet the demand of industrial production. Therefore, the method to achieve efficient preparation and production of antibacterial peptides is a research hotspot. Antimicrobial peptide Sublancin168 is one of the metabolites secreted by *Bacillus subtilis*, which has specific structure and antibacterial activity, but its antibacterial properties need to be further explored. Its thermal stability, digestive enzyme stability and safety are also the conditions that need to be satisfied when it is used as a feed additive. In order to meet the needs of industrial production, the preparation method of heterologous expression is generally adopted. *Escherichia coli, Pichia pastoris* and other host engineering strains need inducers to induce the expression of foreign proteins, and the produced foreign proteins cannot be directly applied to feed additives. *Trichoderma reesei*, as a food-grade safe strain (GRAS), can meet the safety requirements of foreign proteins produced, and has the advantages of strong promoter and strong post-translation processing ability of protein, which can lay a foundation for the safety of feed additives.

SUMMARY

The purpose of the present disclosure is to provide a method for preparing recombinant antimicrobial peptide TrSub in *Trichoderma reesei* and its antibacterial properties, and to use the recombinant antimicrobial peptide TrSub as a feed additive in the feed industry.

The other purpose of the present disclosure is to provide a recombinant antimicrobial peptide TrSub amino acid sequence.

Another purpose of the present disclosure to provide a *Trichoderma* recombinant expression vector including the above antimicrobial peptide gene.

It is still another purpose of the present disclosure to provide a recombinant strain including the above antimicrobial peptide, The recombinant strain is *Trichoderma reesei* Tu6.

The disclosure also provides the application of the recombinant antibacterial peptide TrSub in feed or feed additive.

The above purpose of the disclosure is realized by the following technical scheme:

A recombinant antimicrobial peptide TrSub, wherein the amino acid sequence of the recombinant antimicrobial peptide TrSub is shown in SEQ ID NO. 1, specifically EFGAGKAQCAAAW LQCASGGTLGC GGG AVACQNYRQFQCRAA.

The nucleotide sequence encoding the amino acid sequence of SEQ ID NO.1 is shown in SEQ ID NO.2, the SEQ ID NO.2 is a mutant obtained by translating the antibacterial peptide Sublancin168 of the original amino acid sequence of SEQ ID NO.3 into a coded nucleotide sequence, artificially synthesizing the nucleotide fragment, and carrying out error-prone PCR reaction on the artificially synthesized fragment.

The SEQ ID NO. 2 is:
gaattcggagctggaaaggctcaatgtgctgctgcttggttgcaatgtg
cttcaggaggtactttgggatgtggaggaggagctgttgcttgtcaaaa
ctacagacaa ttttgtagagcggcg.

The SEQ ID NO. 3:
GLGKAQCAALWLQCASGGTIGCGGGAVAC QNYRQFCR.

A method for preparing an recombinant antibacterial peptide TrSub, including: amplifying a gene fragment of antibacterial peptide Sublancin168 through error-prone PCR reaction, detecting an error-prone PCR fragment by agarose gel electrophoresis, and inserting *Trichoderma* expression vector by homologous recombination in vitro to construct the recombinant expression vector of recombinant antibacterial peptide Sublancin168; transforming a recombinant expression vector into *Trichoderma* Tu6 by protoplast transformation mediated by polyethylene glycol, screening and verifying positive transformants, and the recombinant antibacterial peptide TrSub is obtained by fermentation expression.

The application of the recombinant antibacterial peptide TrSub in the preparation of feed and feed additives.

Advantageous effects of the present disclosure compared with the prior art:
  a recombinant antimicrobial peptide TrSub was obtained by error-prone PCR, and its recombinant expression vector mutation library in *Trichoderma reesei* was constructed.

In the present disclosure, the recombinant antimicrobial peptide TrSub is heterologous expressed in the *Trichoderma reesei* Tu6, the recombinant antimicrobial peptide TrSub expression product is obtained, and the method for preparing the recombinant antimicrobial peptide TrSub in the *Trichoderma reesei* Tu6 is provided.

The antibacterial activity of the recombinant antibacterial peptide TrSub expression product is characterized, and it has inhibitory effect on *Escherichia coli, Salmonella, Staphylococcus aureus* and *Clostridium perfringens*.

The recombinant antibacterial peptide TrSub of the disclosure has good thermal stability, acid and pepsin resistance

DETAILED DESCRIPTION OF THE EMBODIMENTS

Figure 1:
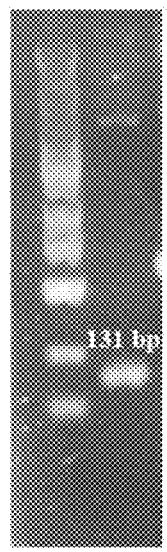
FIG. 1 is an electrophoresis diagram of gene amplification nucleic acid of recombinant antibacterial peptide TrSub.

Embodiment 1 Error-prone PCR of Recombinant Antimicrobial Peptide TrSub Gene The amino acid sequence of antimicrobial peptide Sublancin 168 published in GenBank: Ace07988.1 was used as the original sequence, and the encoded nucleotide sequence was translated by DNAMAN software, and the nucleotide fragment was synthesized. Error-prone PCR was performed on the synthesized fragment by PrimeSTAR® high-fidelity PCR enzyme, and the PCR reaction system (50 µL) was 5×PrimeSTAR® Buffer 10 µL; dNTP 4 µL; PrimeSTAR® 0.5 µL; pf 2 µL; pr 2 µL; Template 1 µL; ddH$_2$O 30.5 µL. PCR reaction conditions were as follows: predenaturation at 95° C. for 3 min, denaturation at 95° C. for 30 sec, annealing at 56° C. for 30 sec, elongation at 72° C. for 1 min, 35 cycles, total elongation at 72° C. for 10 min and total elongation at 4° C. After completion of the PCR reaction, the gene amplification target band of the antimicrobial peptide TrSub was detected by agarose gel electrophoresis, as shown in FIG. 1. The PCR products were digested with DpnI enzyme and the digestion system was DpnI 1 µL, Fast Digest Buffer 5 µL at 37° C. for 2 h. The PCR digestion product was recovered and purified using a Cycle Pure Kit PCR purification kit, and the recovered product was an error-prone PCR gene fragment of the antimicrobial peptide Sublancin 168.

Figure 2:
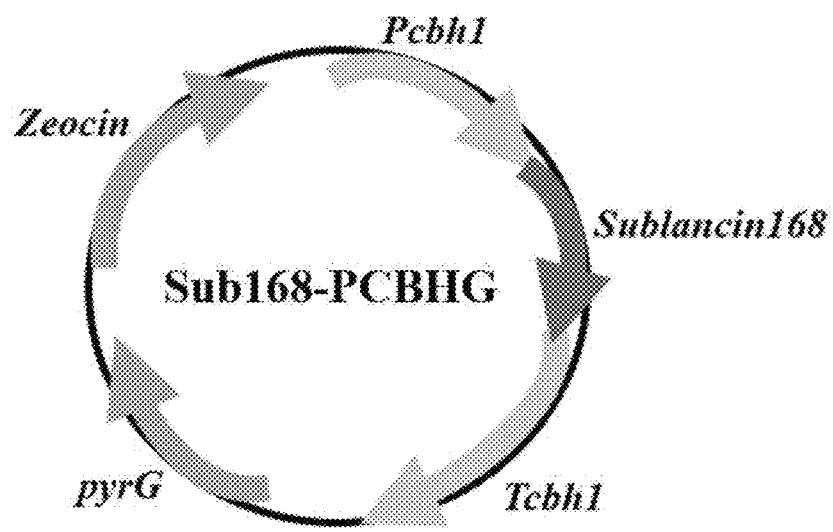
FIG. 2 is a schematic diagram of the construction of recombinant expression vector PCBHG-TrSub.

Embodiment 2 Error-Prone PCR Product of the Antimicrobial Peptide Sublancin 168 Gene was Inserted into the *Trichoderma* Tu6 Expression Vector to Construct the Recombinant Expression Vector Sub168-PCBHG The linearized primers of the *Trichoderma* tu6 vector were used to linearize f: 5'-gctcgtgcgaagcct-3' and r: 5'-agcacgctgtgggccaag-3' by per reaction, the enzyme used for PCR was Phanta® Super-Fidelity DNA Polymerase, the PCR reaction system (50 µL) was 5×SF Buffer 25 µL; dNTP 1 µL; Phanta® 0.5 µL; pf 2 µL; pr 2 µL; carrier PCBHG 1 µL; ddH$_2$OµL; 18.5 µL. PCR reaction conditions were as follows: predenaturation at 95° C. for 3 min, denaturation at 95° C. for 30 sec, annealing at 58° C. for 30 sec, elongation at 72° C. for 8 min, 35 cycles, total elongation at 72° C. for 10 min and total elongation at 4° C. After the nucleic acid electrophoresis test, it was digested by template and recovered and purified by Cycle Pure Kit PCR purification kit, and the recovered fragment of linearized vector was obtained. Homologous recombination was carried out in vitro ligation of that fragment recovered in embodiment 1 to the linearize vector using the homologous recombination ligase Exnase II and the ligation system (50·mu·L):CE II Buffer 2 µL; Exnase II 0.5 µL; linearized vector 0.5 µL; Sublancin 168 1 µL; ddH2O 1 µL. Connection condition: 37° C., 30 min. Homogeneous recombinant ligation product was then transformed into *E. coli* DH5a, coat, cultured at 37 DEG C. for 14-16 hours, single colony was picked for colony PCR and sequence verification, and that recombinant expression vector Sub168-PCBHG was constructed after alignment, the composition is shown schematically in FIG. 2.

Embodiment 3 Transformation of *Trichoderma* Recombinant Expression Vector of Antibacterial Peptide TrSub The host strains of *Trichoderma reesei* were subcultured on PDA+U solid medium plates at 30° C. for 5-6 days. Mature host strains of *Trichoderma reesei* were inoculated into YEG+U medium and cultured at 30·degree·C. and 180 rpm for 20 hours as expression host. Filter the mature bacterial solution, collect the mycelia on the filter cloth into a sterilized conical flask, add lyase, and crack at 30° C. and 90 rpm for 2 hours. During the period, take samples at intervals of 30 minutes in a sterile workbench, and observe the shape and number of protoplasts generated by cracking with a blood cell counter under a microscope until it reaches 108 CFU/mL. The lysate in the Erlenmeyer flask was filtered and centrifuged, washed repeatedly with a 1 M sorbitol solution and suspended 3 times, and the final protoplast precipitate was collected.

Embodiment 4 Fermentation Expression of Antibacterial Peptide TrSub in *Trichoderma*

The recombinant plasmid constructed in embodiment 2 was extracted by E.Z.N.A. plasmid mini kit I kit, and the extracted recombinant plasmid was transferred to the prepared *Trichoderma* protoplast for mixing. Polyethylene glycol solution was added to the mixed solution and incubated on ice for 30 min, and then cultured in PDA solid medium at 30° C. for 5-6 days.

Figure 3:
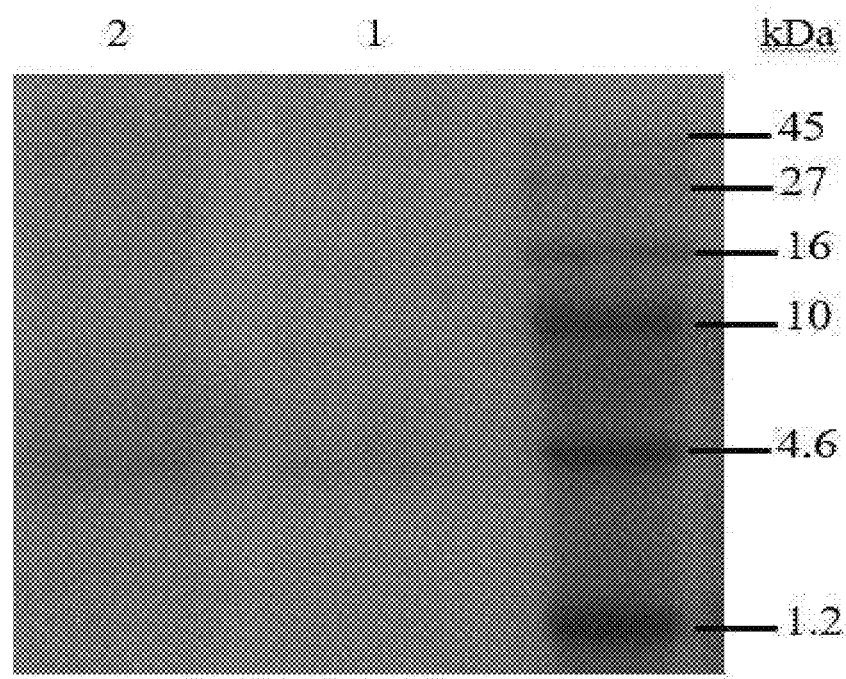
FIG. 3 is a schematic diagram of protein electrophoresis detection of the expression product and purified product of recombinant antibacterial peptide TrSub.

Transformants grown in PDA solid culture medium are selected on a new plate for screening. After hyphae and spores grow, genome extraction is carried out and their target genes are verified. The screened positive transformants are inoculated into *Trichoderma* fermentation medium for fermentation and expression at 30° C. and 180 rpm for 5-6 days. During this period, the temperature is lowered after the bacteria grow obviously. The fermentation product was preliminarily screened in 96-well plate, and the specific screening process was as follows: *Escherichia coli* was initially used as indicator bacteria, which was cultured to logarithmic growth stage and diluted to 105 CFU/mL with LB liquid medium. One ml of diluted bacterial suspension was added to the same amount of antibacterial peptide fermentation product, and the 96-well plate was cultured in a shaking table at 37° C. for about 14 hours. The clarity was observed with naked eyes and its OD600 nm was measured. Samples with low OD600 nm value and relatively clear visual observation were preliminarily screened, that is, a recombinant antibacterial peptide TrSub was screened, the amino acid sequence of which is shown in SEQ ID NO.1, and the encoded nucleotide is shown in seq id No.2. The product was filtered and collected, and detected and analyzed by SDS-PAGE. The selected samples were purified and the protein concentration was determined. SDS-PAGE detection is shown in FIG. 3.

Embodiment 5 Determination of Antibacterial Activity of Antibacterial Peptide TrSub Determination of Minimum Inhibitory Concentration (MIC)

The indicator bacteria used in this example are *Escherichia coli*, *Salmonella*, *Staphylococcus aureus* and *Clostridium perfringens*.

The specific determination method of MIC is micro-double dilution method: four kinds of bacteria are cultured in their liquid culture medium to logarithmic growth stage, and each bacterial cell is collected and diluted to the bacterial cell concentration of 105 CFU/mL for later use. This step is the preparation of bacterial suspension. The purified collected antimicrobial peptide trsub solution was mixed in equal amounts with the liquid medium of the bacterial suspension in the first column of 96-well plates to an antimicrobial peptide sample starting concentration of 200 μg/ml, followed by continuous double dilution in subsequent columns, concentration gradient. Equal amount of diluted bacterial suspension was added to the 96-well plate concentration gradient samples and incubated in an incubator at 37° C. for 16 hours. After incubation, the turbidity of each hole was observed with naked eyes. The MIC of antimicrobial peptide TrSub to each bacterium was the minimum concentration that could make the hole clear, and the results were shown in Table 1.

TABLE 1

Minimum inhibitory concentration and minimum bactericidal concentration of different bacteria of recombinant antibacterial peptide TrSub

| Name | MIC (μg/mL) Gram-negative bacteria colon bacillus | salmonella | Gram-positive bacteria Clostridium perfringens |
|---|---|---|---|
| TrSub | 37.5 | 37.5 | 25 |

| | MBC (μg/mL) Gram-negative bacteria colon bacillus | salmonella | Gram-positive bacteria Clostridium perfringens |
|---|---|---|---|
| TrSub | 37.5 | 75 | 25 |

Determination of Minimum Bactericidal Concentration (MBC)

According to the result of MIC determination process, the antibacterial peptide TrSub can make each bacterium present a clear concentration, and then be sampled and applied to the corresponding solid medium of each bacterium, and the colonies growing on the plate are observed after 16 h of culture. The concentration of the sample capable of inhibiting the growth of 99.9% bacteria was the MBC of the antimicrobial peptide TrSub to each bacterium, and the results are shown in Table 1.

Embodiment 6 Thermal Stability Determination of Antibacterial Peptide TrSub

The antimicrobial peptide TrSub samples were heat treated in boiling water for 5 min, 10 min, 15 min, 20 min, 25 min and 30 min, respectively. the heat treated samples were taken as test samples and the non-heat treated samples were taken as control. Four indicator bacteria were cultured to logarithmic growth phase and diluted to a bacterial concentration of 105 CFU/mL. The antimicrobial peptide samples treated with different heat treatment times were mixed with the diluted bacterial suspensions, incubated at 37° C. for 18 h, the absorbance was measured at 600 nm, and the samples without heat treatment were used as control. The inhibition rate of the samples to the bacteria after different heat treatment time was calculated.

Figure 4:
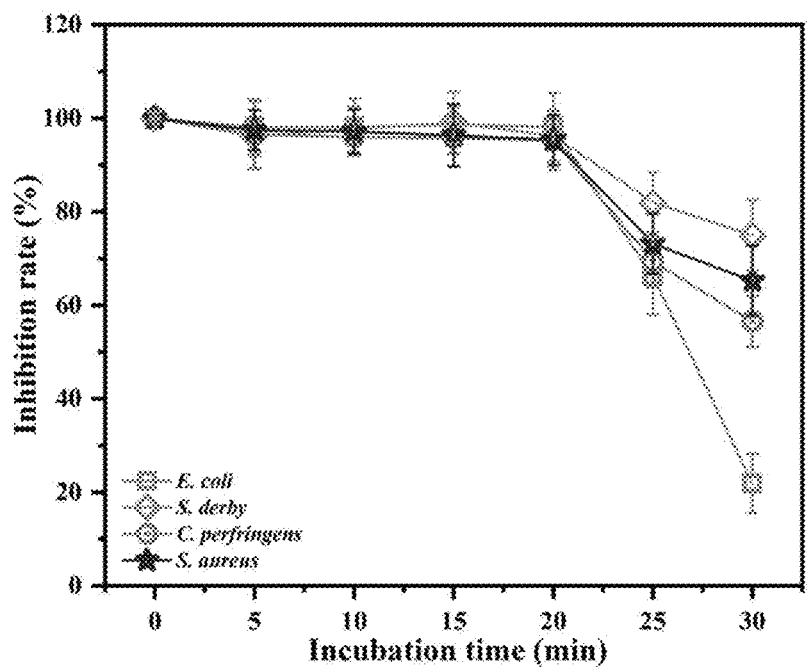
FIG. 4 is a schematic diagram of thermal stability of recombinant antibacterial peptide TrSub.

As shown in FIG. 4, the antibacterial peptide TrSub had almost no obvious change in the inhibition rate of each bacterium after being treated at high temperature for different time, and almost no change in the inhibition rate of each bacterium after being treated in boiling water for 20 min. The inhibition rate of the recombinant antimicrobial peptide TrSub was still about 80% after 25 min treatment, which indicated that the recombinant antimicrobial peptide TrSub had good thermal stability and could withstand the high temperature treatment of industrial processing.

Embodiment 7 Determination of Digestive Enzyme Stability of Recombinant Antimicrobial Peptide TrSub The recombinant antimicrobial peptide TrSub was tested for the stability of digestive enzymes and its tolerance to digestive enzymes was evaluated. The digestive enzymes used in this example were pepsin and trypsin, and pepsin was diluted to 3000 U/mL with Gly-HCl buffer at pH 2.0 and trypsin was diluted to 250 U/mL with Tris-HCl buffer at pH 8.0, respectively. Antimicrobial peptide TrSub solution was diluted to its MIC by pepsin and trypsin solution prepared by dilution, respectively. Here and the following examples, without explanation, all refer to MIC of *Escherichia coli*. The diluted antibacterial peptide TrSub solution was incubated at 37° C. for 30-180 min as the sample to be tested. The samples to be tested were mixed with diluted four bacterial suspensions, then cultured at 37° C. for 18 h, and their absorbance values were measured at 600 nm. Taking the samples without pepsin and trypsin treatment as the control, the inhibition rates of the two digestive enzymes for different time were calculated.

Figure 5A:
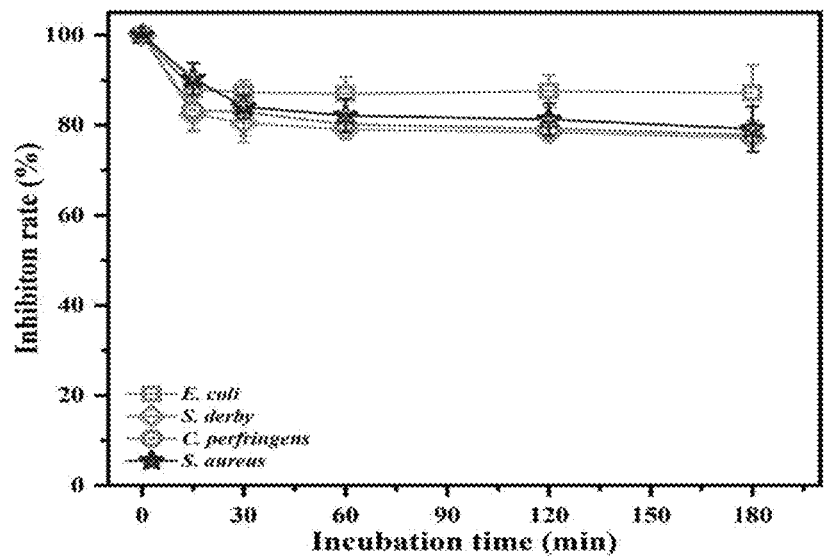
FIG. 5A is a schematic diagram of pepsin stability of recombinant antibacterial peptide TrSub; 5B is a schematic diagram of trypsin stability of recombinant antibacterial peptide TrSub.
Figure 5B:
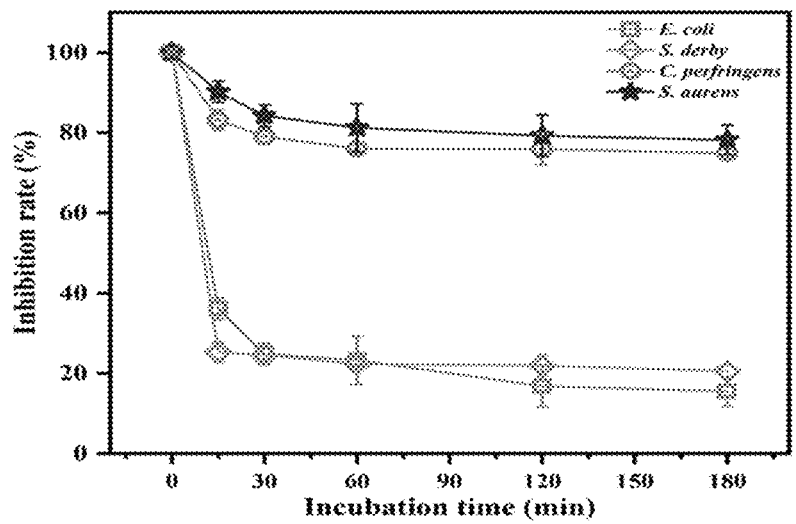

According to the determination, the recombinant antibacterial peptide TrSub has a good stability to pepsin, and the inhibition rate to various bacteria can still maintain a high level (above 80%) after being treated by pepsin (FIG. 5A), but the stability to trypsin is poor, which is greatly influenced by trypsin. After trypsin treatment, the main hard bacteria were Gram-negative bacteria, and the inhibition rate of the two Gram-positive bacteria remained about 80% (FIG. 5B).

Embodiment 8 Determination of Hemolytic Activity of Recombinant Antibacterial Peptide TrSub The hemolytic activity of recombinant antibacterial peptide TrSub was determined by using the purchased rabbit red blood cells. The rabbit blood cells were washed and resuspended with PBS solution for 2-3 times. The final blood cells were collected, mixed with the antibacterial peptide TrSub solution continuously diluted twice in 96-well plate, and incubated at 37° C. for 1 h. After incubation, the mixed sample was centrifuged at 1200 rpm for 10 min, the supernatant was collected and transferred to a new 96-well plate, and its absorbance was measured at 570 nm. In this embodiment, 0.1% Triton X-100 was used as a positive control, and the hemolysis rate was 100%; PBS solution was used as negative control, and its hemolysis rate was 0. According to the formula definition, hemolysis rate (%)=(OD570 nm of BMG lvA2-OD570 nm of PBS)/(OD570 nm of 0.1% Triton X-100-OD570 nm of PBS)*100%.

Figure 6:
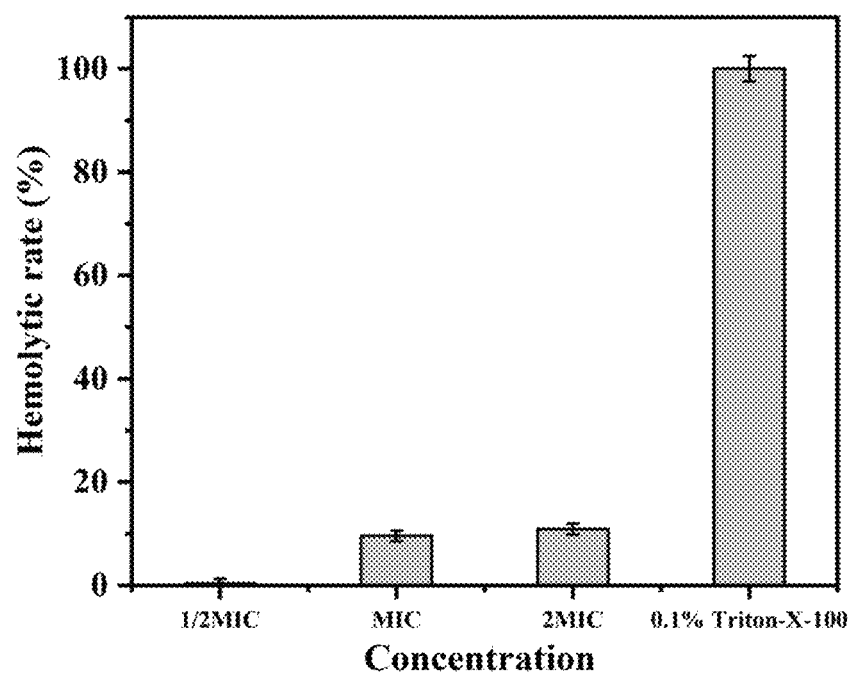
FIG. 6 is a schematic diagram of hemolytic activity of recombinant antibacterial peptide TrSub on rabbit red blood cells.

As shown in FIG. 6, the hemolytic activity of the recombinant antibacterial peptide TrSub at MIC concentration and 2MIC concentration is below 10%, indicating that the screened recombinant antibacterial peptide TrSub has low hemolytic activity, which further enhances its application safety.

What is claimed is:

1. A recombinant antibacterial peptide TrSub an having the amino acid sequence shown in SEQ ID NO.1.

2. A synthetic nucleotide sequence encoding the amino acid shown in SEQ ID NO.1, wherein the nucleotide sequence is shown in SEQ ID NO.2.

3. A recombinant expression vector comprising the synthetic nucleotide sequence shown in SEQ ID NO.2.

4. A recombinant host strain comprising the synthetic nucleotide sequence shown in SEQ ID NO.2, wherein said recombinant host strain is *Trichoderma reesei* Tu6.

5. A product comprising the recombinant antibacterial peptide TrSub of claim 1, wherein said product is a feed or its additives.

* * * * *

SEQUENCE LISTING

```
Sequence total quantity: 3
SEQ ID NO: 1            moltype = AA  length = 42
FEATURE                 Location/Qualifiers
source                  1..42
                        mol_type = protein
                        note = the amino acid sequence of the recombinant
                         antimicrobial peptide TrSub
                        organism = synthetic construct
SEQUENCE: 1
EFGAGKAQCA AAWLQCASGG TLGCGGGAVA CQNYRQFQCR AA                           42

SEQ ID NO: 2            moltype = DNA  length = 123
FEATURE                 Location/Qualifiers
source                  1..123
                        mol_type = other DNA
                        organism = synthetic construct
SEQUENCE: 2
gaattcggag ctggaaaggc tcaatgtgct gctgcttggt tgcaatgtgc ttcaggaggt        60
actttgggat gtggaggagg agctgttgct tgtcaaaact acagacaatt ttgtagagcg       120
gcg                                                                    123

SEQ ID NO: 3            moltype = AA  length = 37
FEATURE                 Location/Qualifiers
source                  1..37
                        mol_type = protein
                        note = the antibacterial peptide Sublancin 168 of the
                         original amino acid sequence
                        organism = synthetic construct
SEQUENCE: 3
GLGKAQCAAL WLQCASGGTI GCGGGAVACQ NYRQFCR                                37
```